United States Patent [19]
Smith et al.

[11] Patent Number: 5,093,951
[45] Date of Patent: Mar. 10, 1992

[54] TOP BRUSH INTERRUPT SYSTEM FOR A CAR WASH

[75] Inventors: Terrence J. Smith; Richard M. Grier, both of Des Moines, Iowa

[73] Assignee: Ryko Manufacturing Company, Grimes, Iowa

[21] Appl. No.: 529,931

[22] Filed: May 29, 1990

[51] Int. Cl.$^5$ ............................................. B60S 3/06
[52] U.S. Cl. ................................. 15/53.2; 15/DIG. 2
[58] Field of Search ................. 15/DIG. 2, 53.1, 53.2, 15/53.3, 302

[56] References Cited

U.S. PATENT DOCUMENTS 3,822,429  7/1974  Thompson ........................... 15/53.2
4,562,848  1/1986  Messing et al. .................. 15/53.2 X Primary Examiner—Edward L. Roberts
Attorney, Agent, or Firm—Allegretti & Witcoff, Ltd.

[57] ABSTRACT

A top brush interrupt system for a vehicle wash system particularly adapted for pickup trucks that includes a top brush rotatable on a generally horizontal cross shaft that journalled in a pair of spaced arms that are pivoted on a frame for movement toward and away from the top of the vehicle to be washed. The interrupt system includes a proximity switch on the frame cooperating with a proximity target on one of the arms for sensing when the top brush is in position on top of the vehicle and for indicating when the top brush is not on the top of the vehicle and associated circuitry including timing means for terminating rotation of the top brush and/or raising the top brush from the vehicle.

9 Claims, 3 Drawing Sheets

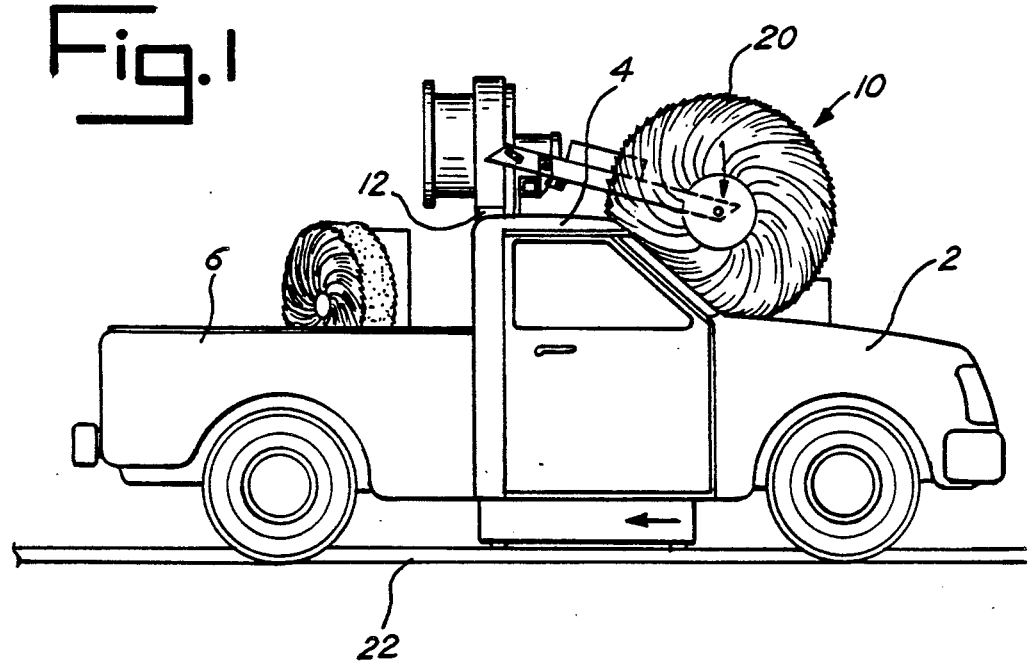
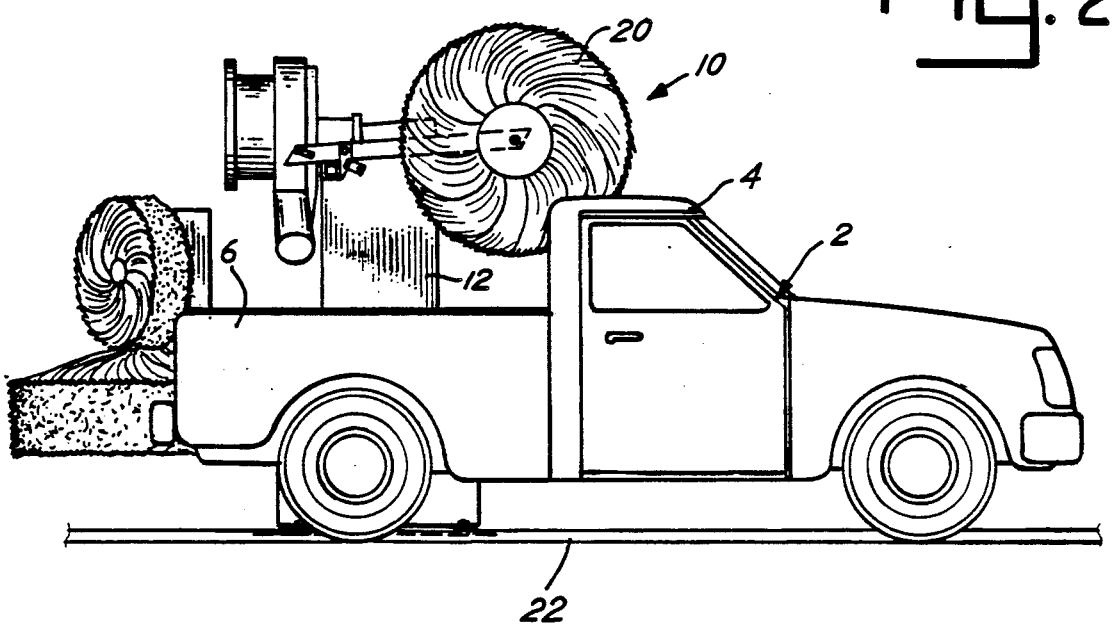

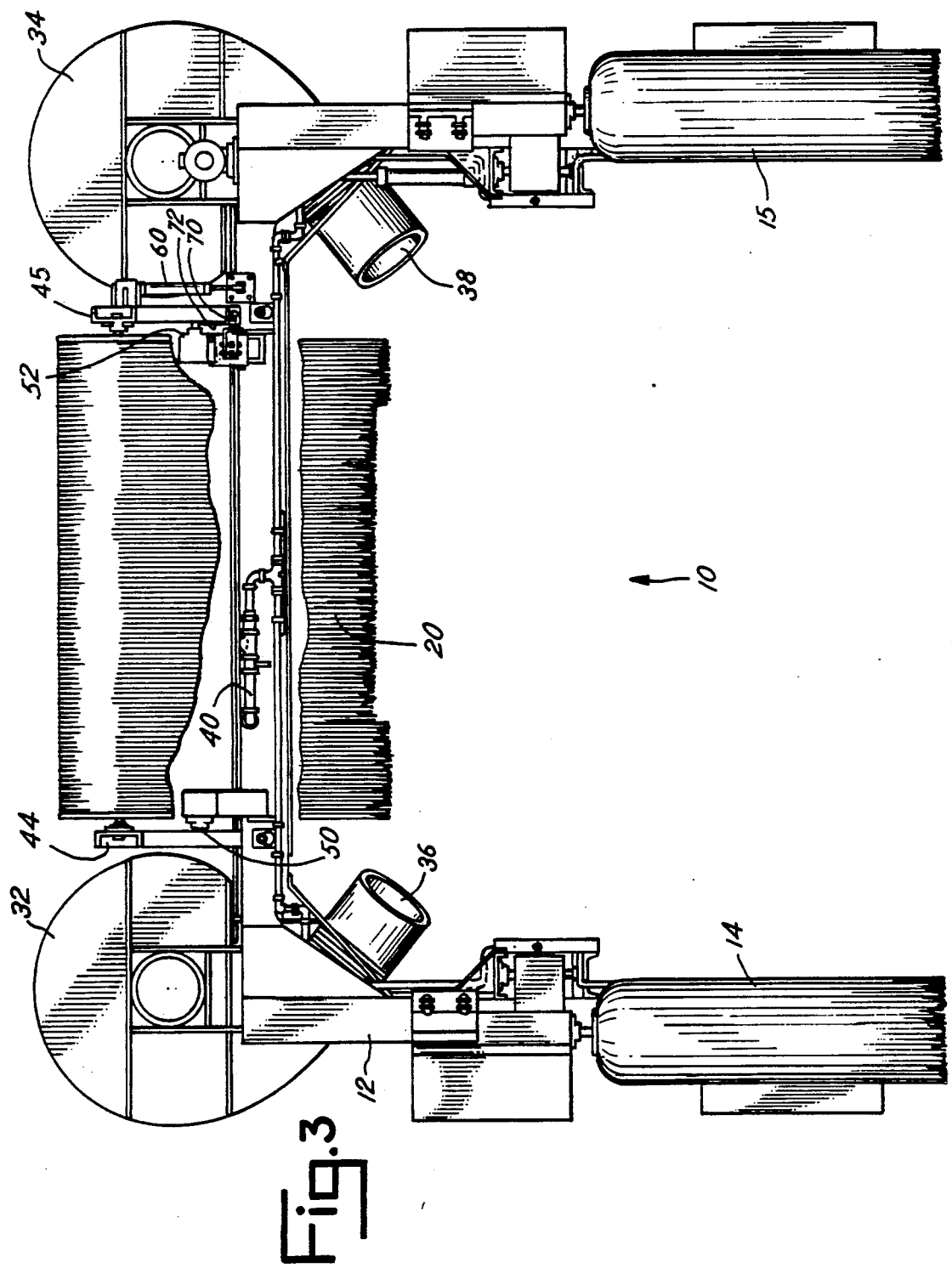

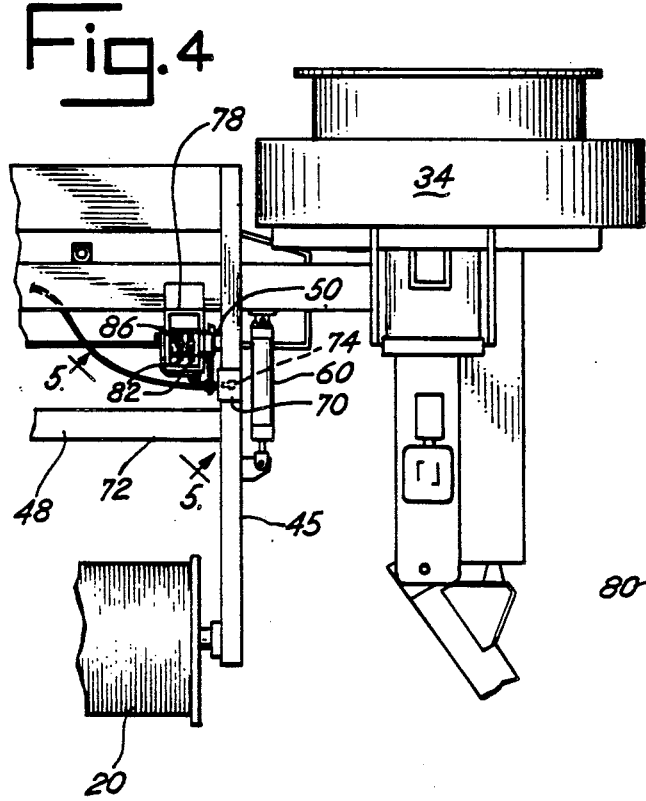
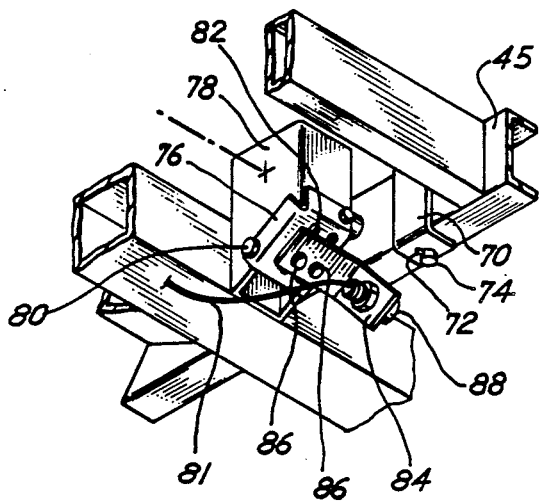
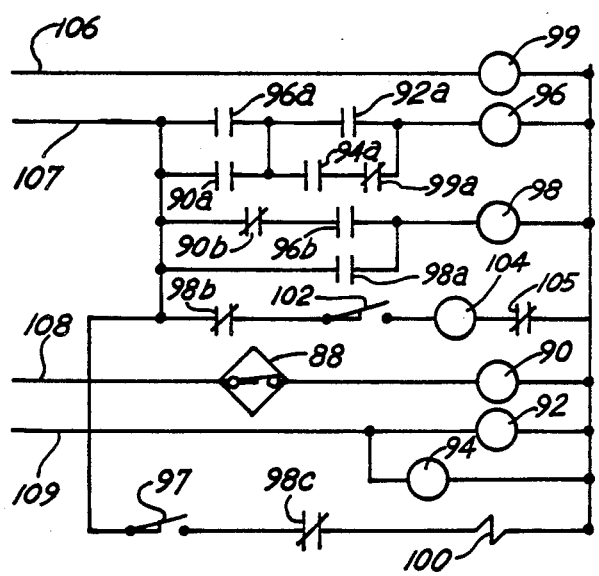
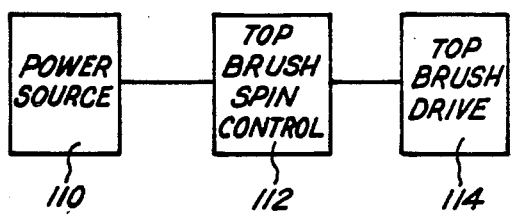

TOP BRUSH INTERRUPT SYSTEM FOR A CAR WASH

BACKGROUND OF THE INVENTION

This invention pertains to a top brush interrupt system for a car wash and more particularly to a top brush interrupt system which is able to distinguish pickup trucks from cars to prevent the top brush from entering the beds of the pickup trucks and causing damage or from dislodging or disturbing the contents of the beds of the pickup trucks.

In the past with car wash systems, as shown for example, in Nelson U.S. Pat. No. 4,685,169, difficulty has been encountered in distinguishing between cars and pickup trucks. Some prior car wash systems include a track gantry or frame that moves along the track and over the vehicle. Water outlets and brushes on the track gantry wash the car. One of the brushes is a top brush which is carried by a pair of arms pivoted on the frame and moved by air cylinder means for movement toward and away from the top of the vehicle. The top brush is rotated by a motor carried on one of said pair of arms for assisting vehicle washing.

In such past systems, the top brush was arranged to track the top of the vehicle. While the car wash worked satisfactorily for cars, problems were encountered with pickup trucks. The top brush would drop into the bed of the pickup truck and possibly pick up debris that would damage the pickup truck or the top brush. Additionally, debris from the pickup truck would sometimes cling to the top brush and damage the next vehicle to be washed.

To overcome these problems, a top brush interrupt system employing a mechanical limit switch was developed. The mechanical limit switch had an actuating arm that rested on a cross brace channel secured between the two arms supporting the top brush. The mechanical switch functioned to determine when the top brush dropped below the cab height on a pickup. The mechanical limit switch was on when the shaft of the top brush was more than a predetermined distance off the floor, e.g., 84 inches in one embodiment. The circuitry affected by the mechanical limit switch was activated during a period of time related to the car wash rearward travel time. The time period started several seconds after the top brush started to lower onto the hood of the vehicle allowing the top brush to drop onto the hood before activating the circuitry referred to above. This time period lasted until the track gantry stopped its reverse movement. Depending upon the model of car wash, this occurred at the time or several seconds after the rear of the vehicle was reached. If the mechanical limit switch made a transition from "on" to "off" (high to low) during said time period, the top brush would be raised and the top brush motor would be shut off.

The orginal top brush interrupt system was found to be unsatisfactory for the smaller pickup trucks being built currently. Merely lowering the the switch height would cause the top brush interrupt system to react to trunks of taller cars as if they were beds of trucks, with the results that such trunks would not be cleaned by the top brush. A second problem was that a number of short bed trucks were ignored by some models of car washes, as the car wash reached the rear of the truck prior to the top brush dropping into the bed. A third problem was that the mechanical limit switch was not accurate enough, since there was some pre-travel built into the switch. Further, the mechanical limit switches could not be set accurately.

An object of the present invention is to provide a car wash for vehicles, particularly pickup trucks, with an improved top brush interrupt system, wherein the disadvantages and difficulties with prior top brush interrupt systems are obviated.

Another object of the present invention is to provide an improved vehicle wash system which automatically determines whether the vehicle is a car or a pickup truck, wherein such determination involves a measurement of overall vehicle height, overall distance from the vehicle front to the drop off of the top brush and the overall distance from the drop off of the top brush to the rear of the vehicle.

Another object of this invention is to provide a car wash with a top brush interrupt system that incorporates an inductive proximity switch for detecting the position of the top brush relative to the vehicle, particularly, a pickup truck to more accurately and timely lift the top brush from the bed of the pickup truck and/or stop rotation of the top brush.

Yet another object of the present invention is to provide a car wash for a pickup truck with a top brush interrupt system that includes an inductive proximity switch and timing means for more accurately controlling termination of rotation of the top brush and prevention of the top brush from entering the bed of a pickup truck.

Other objects and advantages of the present invention will be made more apparent hereinafter.

BRIEF DESCRIPTION OF THE DRAWINGS

There is shown in the attached drawing a presently preferred embodiment of the present invention, wherein like numerals in the various views refer to like elements and wherein:

FIG. 1 is a side view of the car wash, illustrating the top brush in position as it begins to wash the cab of a pickup truck.

FIG. 2 is a side view of the car wash illustrating the top brush as it clears the rear of the cab of a pickup truck, at the position where the top brush interrupt system is actuated so as to prevent the top brush from entering the bed of the pickup truck and terminating rotation thereof;

FIG. 3 is an end view of the car wash which includes the top brush interrupt system of the present invention;

FIG. 4 is a partial plan view of the car wash of FIG. 3;

FIG. 5 is a detail perspective view of the top brush interrupt switch;

FIG. 6 is a schematic of the essential electical components of the top brush interrupt system; and FIG. 7 is a block diagram of the top brush power source, spin control and drive.

DETAILED DESCRIPTION OF THE PRESENT INVENTION

In FIGS. 1 and 2 there is illustrated two steps in the washing of a pickup truck 2 by the car washer and drying apparatus 10. FIG. 1 illustrates the car washer and drying apparatus 10 as the top brush 20 rises to the top of the cab 4 of the pickup truck. During this time water is being applied to the pickup truck 2 and the top brush 20 is rotated. FIG. 2 illustrates the car washer and drying apparatus 10 after the track gantry or frame 12 has moved rearwardly on the track 22. The top brush 20 has just cleared the rear of the cab 4 and as it begins to drop the top brush interrupt system of this invention is actuated to preclude the top brush 20 from entering the bed 6 of the pickup truck 2 and/or stopping rotation of the top brush 20. The structure and operation of the top brush interrupt method and system will be make more clear in the following description pertaining to FIGS. 3-6.

Referring to FIGS. 3 and 4, there is shown the car washer and dryer apparatus 10 embodying the top brush interrupt system of the present invention. Apparatus 10 includes a track gantry 12 adapted to move along a track (not shown) in the car wash bay. Carried on the track gantry or frame 12 are a first pair of brushes 14, 15, a second pair of brushes (not shown) and a top brush 20. Brushes 14, 15 are driven by suitable electric drive motors operatively connected thereto via speed reducers. The second brushes are similarly driven by suitable electric drive motors and speed reducers. The top brush 20 is rotated by an electric drive motor and speed reducer (not shown) carried on one of the arms 44 or 45 and operatively connected to the rotatable cross shaft 30 that carries the top brush 20.

Carried on the gantry or frame 12 in this illustrative embodiment are a pair of dryers or blowers 32, 34 having nozzles 36, 38 for discharging pressurized air against the vehicle being washed to assist in drying the vehicle by removing the water applied during the washing process.

Water is applied to the vehicle through a water conduit means 40 which comprises a conduit carried on the frame 12 having nozzles or other like openings adjacent the brushes for discharging water onto the brushes 14, 15, 20, (as well as the pair of brushes not shown), and other nozzles or other like openings for applying water directly to the vehicle, as is known in the art.

The top brush cross shaft 30 is journalled at each end in an arm 44, 45. The arms 44, 45 are connected together by a cross channel or beam member 48. Stub shafts 50, 52 are secured to arms 44, 45 respectively and are journalled in bearings carried on the frame 12, for pivotally carrying the top brush 20 on the frame for movement toward and away from a vehicle to be washed. The means for actuating the top brush comprises air cylinder means 60 connected at one end to the frame 12, and at the other end to arm 45.

Considering FIGS. 3 and 4, together with FIG. 5, the structure and arrangement of the top brush interrupt system of the present invention can be better understood. The top brush interrupt system includes a proximity target 70 secured to the arm 45. The proximity target 70, which may be formed from stainless steel, has slotted openings 72 on the top and bottom portions thereof. Bolts or the like fastening means 74 pass through the openings 72 for adjustable securing the proximity target 70 in place on the arm 45. The proximity target 70 is generally U-shaped in configuration to conform to the arm 45 to which it is secured. Bracket 76 is fixedly secured to support channel 78 by suitable fastening means, for example, bolts 80. The bracket 76 is provided with slotted openings 82. Angle bracket 84 is adjustably secured to bracket 76 by bolt and nut or the like fastening means 86. Proximity switch 88 is fixedly secured to the bracket 84 and electrically connected to the operating electrical circuit by electric cable 89. The bracket 84 is adjusted to properly position the proximity switch 88 with respect to the proximity target 70 on arm 45. The proximity switch 88 senses the target 70 when the top brush is below the height determined for the tops of pickup trucks. Depending upon the model of car washer and dryers, the proximity switch 88 may be opened or closed when the target 70 is sensed.

In one modification of the invention, the proximity switch 88 may be fixed to the top of the support channel 78 and the proximity target 70 relocated and adjustably fixed to the top of the arm 45 for cooperation with the proximity switch 88. The function of the proximity switch 88 is no different from that illustrated.

Turning to FIGS. 6 and 7, there is disclosed schematically the top brush interrupt system. FIG. 7 is a block diagram illustrating the power source 110 operatively connected to the top brush spin control 112, which in turn is operatively connected to the top brush drive 114. The basic components may be electrical or hydraulic, though in a preferred embodiment of the present invention the power source 110 is electrical, the spin control 112 is a motor contactor and the top brush drive 114 is an electric motor.

FIG. 6 is an electrical schematic of the significant components of the present invention. Disposed in series with the proximity switch 88 is a first timer 90 that is used to debounce the signal from proximity switch 88 so that the signal can be ignored if the top brush bounces over its set height while cleaning the top of the vehicle. The timer 90 is an on-delay device that will delay turning on a short time after it receives an actuation signal. The second timer 92 sorts between taller cars with short trunks and short bed pickups by timing out prior to dropping onto trunks of taller cars with short trunks. The third timer 94, which is set for a longer period than the second timer 92, sorts between taller cars with long trunks and long and standard bed pickups by timing out prior to dropping onto the trunks of taller cars with long trunks. The second and third timers 92 and 94 are interval timers. They come on immediately upon receiving a signal and stay on for predetermined set interval. Relay 99 operates when the rear of the vehicle is found and sorts between vehicles with long beds or trunks and vehicles with short beds or trunks by limiting the amount of time that the third timer 94 is active.

Normally open contacts 96a and 92a are in series with relay 96. Normally open contact 90a is in parallel with contact 96a and in series with contacts 94a and 99a. Normally closed contact 90b and normally open contact 96b are in series with relay 98. Normally open contact 98a is connected in parallel with the switches 90b and 96b. Normally closed contact 98b is in series with switch 102, which is the top brush spin switch, contactor 104, and normally closed contact 105, which represents a number of motor overload relay contacts in series. Top brush drop 97 and top brush spin switch 102 are two of the 12 switches in the cam bank referred to below. Switch 97 is in series with contact 98c and top brush drop solenoid 100.

Line 106 is connected to the overall car wash circuitry and provides an arm limit switch signal when the front or rear arms carrying the front and rear brushes wrap around the front or rear of the vehicle 2 and operate a limit switch. Line 107 is powered when the car washer and dryer 10 is operating to wash a vehicle. This occurs when the user pays the fee with a coin or token, for example, and energizes an arming signal and then positions the vehicle properly in the car wash bay to activate an energizing signal. Line 108 provides constant control power. Line 109 provides a signal that limits what portion of a wash cycle that the top brush interrupts system is active. The signal, which relates to the rearward movement of the gantry, comes from one of the switches on a cam bank. The overall circuitry for the car washer circuitry for the car washer and dryer 10 may include a cam bank with a number of switches, for example, twelve in one model of car washer and dryer 10. These switches control all the brushes as well as the track gantry or frame 12 moving back and forth on the track 22 (FIG. 1) over the pickup truck 2.

In operation, the driver of the vehicle may pull adjacent the wash bay and pay a fee with a coin. This or another method, such as a driveway air hose switch or code entry. activates an arming signal. Then he enters the wash bay and positions the vehicle so that the gantry 12 can move the brushes that wash the vehicle. This activates an energizing signal. The gantry moves to the front of the vehicle, stops, then moves over the vehicle front to rear, stops, and then return to the middle. The top brush 20 operates only when the track gantry 12 moves from the front to the rear of the vehicle.

As the track gantry 12 moves rearward relative to the pickup truck 2, as indicated in FIG. 1, the top brush 20 will engage the windshield and move upwardly to the top of the cab 4. The top brush 20 is rotating to help clean the top of the vehicle. The relay 96 latches inself on when the signal from timer 90 indicates that the top brush is at or above a predetermined height corresponding to the height of the cab 4. The relay 98 latches itself on when the signal from timer 90 indicates that the top brush 20 has dropped below the predeterined height after relay 96 has been latched. While relay 98 is latched on, it blocks the normal signals to the top drop brush solenoid 100 and the top brush spin contactor 104, causing the top brush 20 to raise and stop spinning.

A preferred embodiment of the present invention has been described herein. It is to be understood, however, that changes and modifications can be made without departing from the true scope and spirit of the present invention. The true scope and spirit of this invention are defined by the following claims and their equivalents to be interpreted in light of the foregoing specification.

What is claimed is:

1. A vehicle wash system for both an automobile vehicle and a pick-up truck vehicle, said automobile and pick-up truck vehicles each defining a front, a passenger area, a generally horizontal top over said passenger area, a lower rear portion, and a drop off, said drop off defined generally by a boundary between said top and said lower rear portion, comprising, in combination:
   a frame for moving over said vehicle;
   a top brush rotatably carried by said frame, said top brush rotatable about a generally horizontal axis for washing said vehicle, said top brush moving upward, to wash said top of said vehicle, and lowering, from said top to said lower rear portion of said vehicle, to wash said lower rear portion of said vehicle, as said frame moves over said vehicle;
   measurement means for measuring distance from said front of said vehicle to said drop off of said vehicle and responsively producing a measurement signal; and
   interrupt means, interconnected to said measurement means, for receiving said measurement signal and selectively controlling said lowering of said top brush.

2. A vehicle wash system as claimed in claim 1 wherein said measurement means measures a drop off time for said top brush to move from said front of said vehicle to said drop off of said vehicle, said drop off time signal substantially directly corresponding to said distance from said front of said vehicle to said drop off of said vehicle.

3. A vehicle wash system as claimed in claim 1 wherein said interrupt means selectively terminates said lowering of said top brush when said distance from said front of said vehicle to said drop off of said vehicle is less than a predetermined standard.

4. A vehicle wash system as claimed in claim 1 wherein said interrupt means selectively terminates said rotation and lowering of said top brush when said distance from said front of said vehicle to said drop off of said vehicle is less than a predetermined standard.

5. A vehicle wash system as claimed in claim 1 wherein said top brush moves to different heights as said frame moves over said vehicle, said wash system further including a top sensor to detect said top brush as said top brush moves on to and off of said top of said vehicle and responsively provide a top sensor signal to said interrupt means, whereby said top brush follows a contour of said vehicle as said frame moves and said top sensor provides said top sensor signal when said top brush is urged to said top of said vehicle.

6. A vehicle wash system as claimed in claim 5 wherein said top sensor provides said top sensor signal to said interrupt means when said top brush rises above a predetermined height and said interrupt means responsively terminates lowering of said top brush as said top brush lowers from said top of said vehicle.

7. A vehicle wash system as claimed in claim 5 wherein said top sensor includes a proximity switch, cooperating with a target, for detecting said top brush.

8. A vehicle wash system as claimed in claim 7 wherein said top brush interrupt means includes a timer in series with said top sensor to temporarily block said top sensor signal from said interrupt means, whereby momentary top sensor signals caused by said top brush bouncing above said top of said vehicle are blocked from said interrupt means.

9. A vehicle wash system as claimed in claim 1 wherein said vehicle defines a rear and said wash system includes rear sensor means for sensing said rear of said vehicle and providing a rear sensor signal to said interrupt means, said interrupt means responsively interrupting said lowering of said top brush when said distance from said front of said vehicle to said drop off is less than a predetermined standard and said rear of said vehicle is greater than a predetermined distance from said drop off of said vehicle.

* * * * *